April 26, 1966 D. W. BIESER 3,247,754
SELF-DRILLING ANCHOR BOLT
Filed Aug. 8, 1963
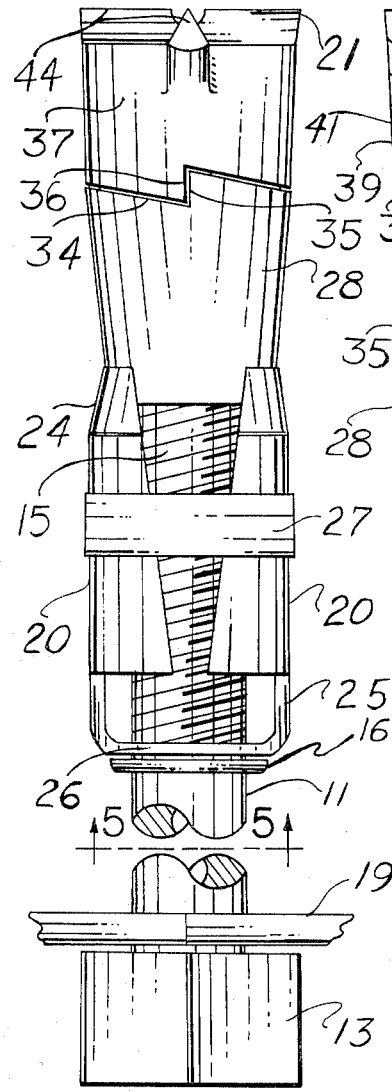
FIG. 1
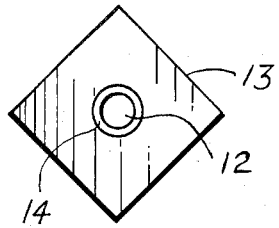
FIG. 2
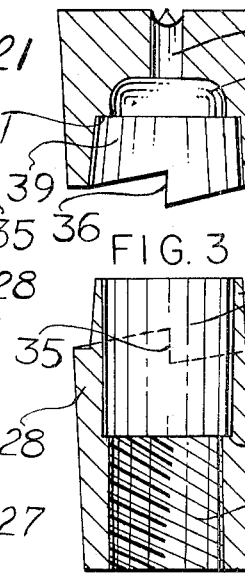
FIG. 3
FIG. 4
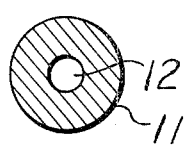
FIG. 5
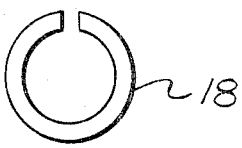
FIG. 6
FIG. 7
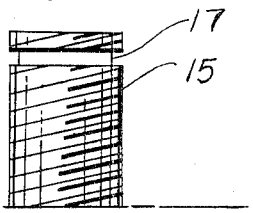
FIG. 8
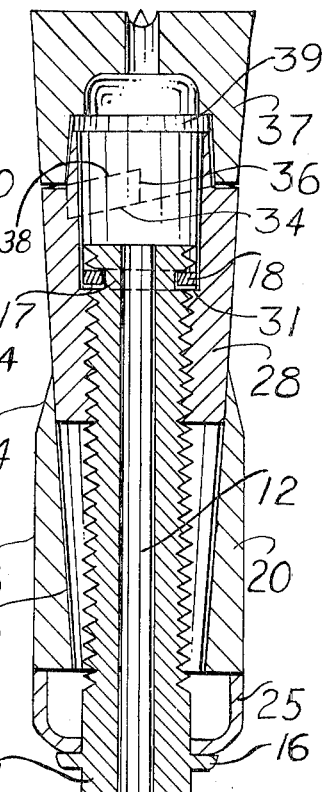
FIG. 9
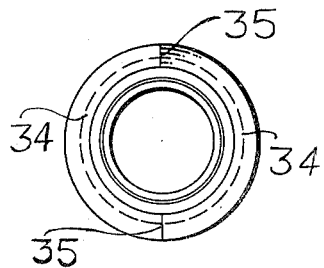
FIG. 10
INVENTOR
*Dennis W. Bieser*
BY *Gerald P. Welch*
ATTORNEY

United States Patent Office 3,247,754
Patented Apr. 26, 1966

3,247,754
SELF-DRILLING ANCHOR BOLT
Dennis W. Bieser, 3317 N. 37th St., Milwaukee, Wis.
Filed Aug. 8, 1963, Ser. No. 301,702
1 Claim. (Cl. 85—68)

This invention relates to improvements in apparatus and method for drilling openings with anchor bolts and securing said anchor bolts in said openings. The novel features of the invention are applicable to stay bolts generally, but are particularly adapted for mine roof support means.

The use of roof bolts as supports for mine roofs and as a means for suspension of cables, hoses and the like, and as a means of anchoring equipment to the floor is a common and well known practice. Generally the installation of a mine roof bolt requires the drilling of the hole or aperture, the removal of the drill steel, the insertion of the bolt in said aperture, and the subsequent tightening or anchoring operation. This sequence of operations is considered unnecessarily time consuming and inefficient.

An object of the invention is to drill openings with anchor bolts which can be secured in the apertures, and thus combine normally separate operations of drilling the openings, removing the drill steel and bits from the openings, aligning and inserting the bolts in the apertures and securing the bolts therein.

A further object of the invention is to drill the openings to a suitable depth and diameter for anchorage of the bolts, thus eliminating overdrilling and underdrill of the openings.

A further object of the invention is to provide a mechanical action to initiate the expanding of the shell portions of the bolt anchor so as to engage the walls of the aperture and subsequently create a source anchor means.

Another object of the invention is to provide an anchor bolt which may be recovered from said opening in the event that salvage, removal or the like is deemed desirable.

Another object of the invention is to provide a means for extending the depth of the opening without removing the bolt previously installed therein in the event the said bolt becomes loosened because of spalling of material in the rock statum about the bearing plate at the mouth of the opening.

Other and further objects of the invention will appear as the description proceeds, reference being had to the accompanying drawing in which:

FIG. 1 is an elevational view of an assembled anchor bolt embodying my invention with the bolt body portion broken.

FIG. 2 is the bottom view of the bolt head.

FIG. 3 is the central vertical sectional view of the drill bit.

FIG. 4 is the central vertical sectional view of the expander plug.

FIG. 5 is a transverse section of the bolt body section taken along line 5—5 of FIG. 1.

FIG. 6 is a top plan view of the restrictor means.

FIG. 7 is an elevational view of the same.

FIG. 8 is a front elevational view of a threaded forward partion of the bolt body.

FIG. 9 is a vertical sectional view of the forward portion of the bolt assembly showing the initial expanding action.

FIG. 10 is a top plan view of the expander plug.

Referring more particularly to the drawing, the numeral 11 designates an elongated rigid member that is preferably circular in cross-section, having a longitudinal opening 12 running axially therein, and a head at the rear portion 13 preferably square in cross-section. The head 13 has a width greater than the outer diameter of the rigid member portion 11, a depth suitable for the engagement of the powering device, and in the preferred form an axial opening 14 suitable for insertion of a flexible or rigid connector, preferably free fitting in the head, to permit passage of liquid, dust particles, cementing agents or the like through said rigid member.

A forward threaded portion of the rigid member is designated by the numeral 15. The shell support means 16 is preferably at least one boss or lug pinched on the rigid member but may be a suitable nut or the like threaded, clamped or affixed to the rigid member. The forward portion of the rigid member having a slotted receptacle 17 or the like to engage a restrictor 18 as shown in its preferred form (FIGS. 6 & 7) resilience directed inwardly. A less desirable modification of the receptacle and restrictor consists of peening over an expanding the forward end of the rigid member.

The numeral 19 designates a bearing plate forwardly of and supported by the head 13.

The shell portion 20 includes at least two longitudinal segments or leaves, preferably of an outer radius at least equal to or greater than the outer radius of the bit portion 21 to provide maximum surface contact with the walls of the drilled opening. The shell sections are tapered on the inner surface 22 being preferably thin at the forward end and thicker at the rear, with smooth inner surface and a preferably cylindrical outer surface 23.

The forward edges of the shell sections 24 are bevelled while at the rear edges, resilient and bendable, is a supporting means 25, preferably integral with the shell sections but may be affixed by suitable means, converging to form a circular portion or collar 26 which encompasses the rigid member 11 and cooperates with the shell collar support means 16. The shell assembly is preferably constructed of a malleable or bendable material stamped or forged as a single unit and bent to the configuration as shown in FIGS. 1 and 9.

A retainer of cardboard or other inexpensive material is designated by the numeral 27 which encircles the shell segments and restricts outer movement of the shell segments 20 which may result from centrifugal forces created while drilling.

An expander plug 28 is shown having a smooth walled axial longitudinal opening in the forward portion 29 being preferably of greater diameter at the forward end and tapered to a slightly smaller diameter toward the rear end to allow movement of the rigid body member 11 and restrictor 18 relative to the expander plug 28. A less desirable form of the opening would be smooth walled without the change in inside diameter. The plug 28 is internally threaded at 30 to engage the threaded forward portion of the rigid member 15. The numeral 31 designates a ledge or the like which engages the restrictor 18 and prevents the expander plug 28 from threading off the rigid member forward portion 15 and rotating independently of the same when drilling the opening. The outer surface of the plug is tapered at 32 to form a wedge that engages the inner surfaces of the shell sections 22.

The expander plug protrusion 33 with preferably a smooth walled outer surface is tapered, being thicker at the rearmost portion and thinner at the forward portion. The circular ramp surface 34 on the plug 28 is interrupted by at least one engaging face; two of which are shown and designated by the numeral 35.

The bit component is generally designated by the numeral 37 having a ramp surface 38 and engaging surfaces 36 that cooperate with the ramp surface 34 and the engaging faces 35 of the expander plug. The bit 37 having a central opening 39 so disposed as to receive the expander plug protrusion 33 which engages the walls of the opening 40 and extends to the surface 41, a central aperture 42 to accommodate the forward rigid body portion 15 if necessary when anchoring the assembly to the walls of the opening, and at least one opening 43 suitable for the passage of liquid, dust particles, cementing agents or the like between the cutting faces 44 of the bit 37 and the rigid body portion 15.

The drill anchor bolt is preassembled as follows: (FIG. 1).

The rigid member 11 is provided with a bearing plate 19 forwardly of the head 13. The shell component 20 is positioned on the rigid member 11 whereby the shell collar 26 contacts the shell support means 16. An expander plug 28 is threaded rearwardly on the threaded portion 15 to expose the restrictor slot 17 onto which the restrictor 18 is disposed and compressed so as to allow the expander plug 28 to be screwed forwardly on the threaded portion 15 until the restrictor contacts the internal ledge 31 of the expander plug 28. The bit component 37 is pressed onto the plug protrusion 33 so that the corresponding ramps 34 and 38 and the engaging faces 35 and 36 are disposed to cooperate. The shell segments 20 are bent so as to encompass the rear portion of the expander plug 28 and then constricted by the retainer 27.

The operation of the drill anchor assembly is as follows:

For purposes of simplification a wet rotary mode of drilling the opening will be employed.

The assembled drill anchor bolt illustrated in FIG. 1 is disposed to engage a rigid or flexible tube that is free fitting in the head 13, and affixed to the powering device which imparts the drilling motion, preferably rotating, but may be percussion or a combination thereof.

The assembled bolt is preferably stabilized for drilling by means preferably clamped to the bearing plate 19 which is positioned forwardly along the rigid member 11.

The bolt assembly is thrust upwardly until the bit cutting edges 44 contact the mine roof. With the bolt thus positioned and under the thrusting force imparted by the powering device, water under pressure is turned on and allowed to flow through the axial opening in the assembly to the cutting edges of the bit 44. At this stage a vacuum type dust collecting system may be activated when drilling dry.

In the preferred case of rotary drilling, the powering device imparts rotation to the head 13 of the rigid member thus rotating the rigid member 11 in a counterclockwise direction, whereby the expander 28 tends to thread forward relatively to the bolt body 11 until the restrictor 18 firmly contacts the ledge 31 of the expander. Further rotation binds the threaded portions of the rigid member 15 and expander 28 imparting the rotary motion to the expander 28, thence to the bit by means of the engaging faces 35 and 36 and frictionally between the outer surface of the expander plug protrusion 33 and the tapered internal opening of the bit 39.

Drill cuttings are forcibly carried away from the cutting edges of the bit 44 by water under pressure transmitted through the axial opening in the bolt assembly emitting from at least one passage way in the bit 43, or drawn into the same passage way when drilling dry and employing a vacuum dust collecting system.

When commencing the drilling operation the retainer means 27 will prevent the shell segments 20 from moving relatively outward due to any centrifugal force that may be transmitted to the shell portion 20 by friction at the collar 26 and the support means 16.

As the depth of the opening increases the shell section 20 is guided into the opening by the beveled edges 24 and is stabilized by the supporting means 25 and the collar 26 which are preferably free fitting on the support 16. The retainer 20 disintegrates or is moved relatively rearwardly of the shell portion 20 as the opening increases in depth. As the opening advances the entire assembly moves forward until the bearing plate 19 contacts the mine roof. Rotation is then halted while still maintaining the forward thrust on the bolt assembly by the powering means thus holding the bit 37 stationary against the forward face of the opening.

At this point the anchoring of the assembly to the walls of the opening commences, as will be now described.

Clockwise rotation is imparted by the powering means to the rigid body portion 11 of the bolt while continuously applying the forward thrust to the bolt assembly, maintaining the bit portion 37 frictionally stationary relative to the forward face of the opening. Upon further rotation a wedging action between the ramp surface of the bit portion 38 and the ramp surface of the expander 34 forces the expander 28 to thread rearwardly on the threaded forward portion of the rigid member 15.

The tapered outer rear portion of the expander plug 28 cooperates with the inner surfaces 22 of the shell segments 20 to force the segments to move laterally thus firmly anchoring the bolt assembly to the walls of the opening. Continued rotation of the rigid member 11 draws the bearing plate 19 tight against the roof as the rigid member 11 threads forward into the opening of the expander at 29; while the supporting means 25 yields under the compressive force, bending but not breaking, the desired tension in the rigid member is attained or the powering device stalls. The bit portion 37 at this point is supported at the forward part of the opening by either the expander plug 28 or the forward portion of the rigid member 15 depenent upon the amount of further progress of the rigid member 11 required to anchor the assembly with the desired tension.

In the event an installed assembly becomes inefficacious by spalling of material in the rock stratum about the bearing plate 19 caused by blasting, subsidence or the like, it is not necessary to remove the installed assembly from the opening to provide an effective assembly.

By revolving the rigid member 11 counterclockwise, the rigid member will thread rearwardly relative to the expander 28 until the restrictor 18 engages the internal ledge 31 of the expander plug and the supporting means 25 retrocedes resuming its original capacity and configuration. With application of forward thrust to the rigid member 11 the expander plug 28 is moved forwardly in the opening becoming disengaged from the shell sections 20 while engaging the bit portion 37. Counterclockwise rotation seats the bit 37 on the expander 28 with cooperating components properly aligned for drilling the opening to a greater depth.

At this juncture the assembly can be removed from the opening if salvage or the like is desired by removal of the forward thrust applied to the rigid member 11 thus allowing the assembly to be extracted from the opening by an applied force directed rearwardly or by the force of gravity.

The sequence of drilling the opening deeper and the anchoring of the assembly cohere in accord with the manner previously disclosed herein.

It will be understood that the device is capable of many modifications in structure and design, without departing from the spirit of the invention, within the scope of the appended claims.

Having thus described the invention, what is claimed and desired to be secured by Letters Patent of the United States, is:

A drill and anchor bolt comprising in combination an elongated threaded bolt, an expander plug having a threaded bore engaged thereon, an annular shoulder at the top of the threaded bore within and approximately centrally of said expander plug, said plug having an enlarged axial bore above the threaded bore, an axial protrusion surrounded by an interrupted inclined circular ramp on the upper surface of the plug, said ramp being inclined in a direction opposite to the helix angle of said threaded bore and a vertical engaging face at the end of said ramp, an upwardly enlarged tapered exterior on said plug, a drill element having a circular body portion centrally apertured, a cutter blade at the top thereof, an interrupted inclined circular ramp and an axial recess at the bottom thereof opposed to the expander plug ramp and protrusion and adapted to engage therewith, a rigid threaded bolt having an axial bore communicating with the bores in the expander plug and the drill element, an annular slot adjacent the top of the threaded bolt, a split ring held therein as a stop to the shoulder on said expander plug, an annular support member adjacent the lower end of the bolt, and an expandable shell supported thereon and embracing the expander plug.

References Cited by the Examiner

UNITED STATES PATENTS

| | | |
|---|---|---|
| 1,342,201 | 6/1920 | Beckwith. |
| 2,667,037 | 1/1954 | Thomas et al. |
| 2,763,469 | 9/1956 | Burls _____ 175—298 |

FOREIGN PATENTS

| | | |
|---|---|---|
| 223,908 | 12/1957 | Australia. |
| 1,092,484 | 11/1954 | France. |

CARL W. TOMLIN, *Primary Examiner.*

EDWIN C. ALLEN, *Examiner.*